United States Patent [19]

Bernard

[11] 4,207,281
[45] Jun. 10, 1980

[54] METHOD OF EXTRUDING SEMI-FLUID MATERIAL THROUGH A HEATED EXTRUDER NOZZLE AND HEATED EXTRUDER NOZZLE

[75] Inventor: Vincent E. Bernard, Richardson, Tex.

[73] Assignee: The Jimmy Dean Meat Company, Inc., Dallas, Tex.

[21] Appl. No.: 914,862

[22] Filed: Jun. 12, 1978

[51] Int. Cl.² .................. B29F 3/08; A22C 11/00; A23L 1/31
[52] U.S. Cl. .................. 264/176 R; 99/441; 99/483; 425/378 R; 425/463; 426/646; 426/513
[58] Field of Search ............... 425/378 R, 133.1, 256, 425/311, 463; 99/441, 494, 483; 426/646, 513; 264/176 R

[56] References Cited

U.S. PATENT DOCUMENTS

| | | | |
|---|---|---|---|
| 530,526 | 12/1894 | Holden | 425/256 X |
| 660,379 | 10/1900 | Kelsey | 425/378 X |
| 1,221,594 | 4/1917 | Richman | 425/311 X |
| 2,532,131 | 11/1950 | Van Voorst | 425/133.1 X |
| 2,572,677 | 10/1951 | Tench | 425/378 R X |
| 2,572,833 | 10/1951 | Balzarini | 99/494 X |
| 2,860,991 | 11/1958 | Christianson et al. | 426/513 |
| 2,953,461 | 9/1960 | Prohaska | 426/513 X |
| 2,967,386 | 1/1961 | Hill | 99/483 X |
| 3,106,747 | 10/1963 | Kelley et al. | 425/378 R |
| 3,421,220 | 1/1969 | Stanga | 425/378 R X |
| 3,468,265 | 9/1969 | Otken | 425/256 X |
| 3,479,970 | 11/1969 | Carbajal | 425/378 R X |
| 3,502,018 | 3/1970 | Keszler et al. | 99/441 X |
| 3,505,085 | 4/1970 | Straugan et al. | 425/378 R X |
| 3,506,415 | 4/1970 | Paladino | 425/378 R X |
| 3,541,946 | 11/1970 | Johnston | 425/133.1 |
| 3,718,166 | 2/1973 | Gordon | 425/570 X |
| 4,084,494 | 4/1978 | Ezaki | 99/494 X |
| 4,113,890 | 9/1978 | Long | 426/513 X |
| 4,124,339 | 11/1978 | Bernard | 425/133.1 X |

*Primary Examiner*—Philip Anderson
*Attorney, Agent, or Firm*—Richards, Harris & Medlock

[57] ABSTRACT

The specification discloses a heated extruder nozzle for extruding semi-fluid material such as ground meats and other food products. The nozzle includes a chamber having a baffle wall dividing the chamber into a first and second baffle area with these baffle areas in fluid communication by an opening through the baffle wall. A plurality of extruder tubes extend through the first and second baffle areas and receive the semi-fluid product therethrough. An inlet extends from the first baffle area and permits the introduction of heated fluid, such as water or steam, into the first baffle area. A return outlet is attached from the second baffle area for discharging heated fluid therefrom. The inlet and outlet communicate with the first and second baffle areas, respectively, on opposite sides of the extruder tubes from the opening in the baffle wall through which fluid is communicated from the first baffle area to the second baffle area.

15 Claims, 4 Drawing Figures

U.S. Patent    Jun. 10, 1980    4,207,281
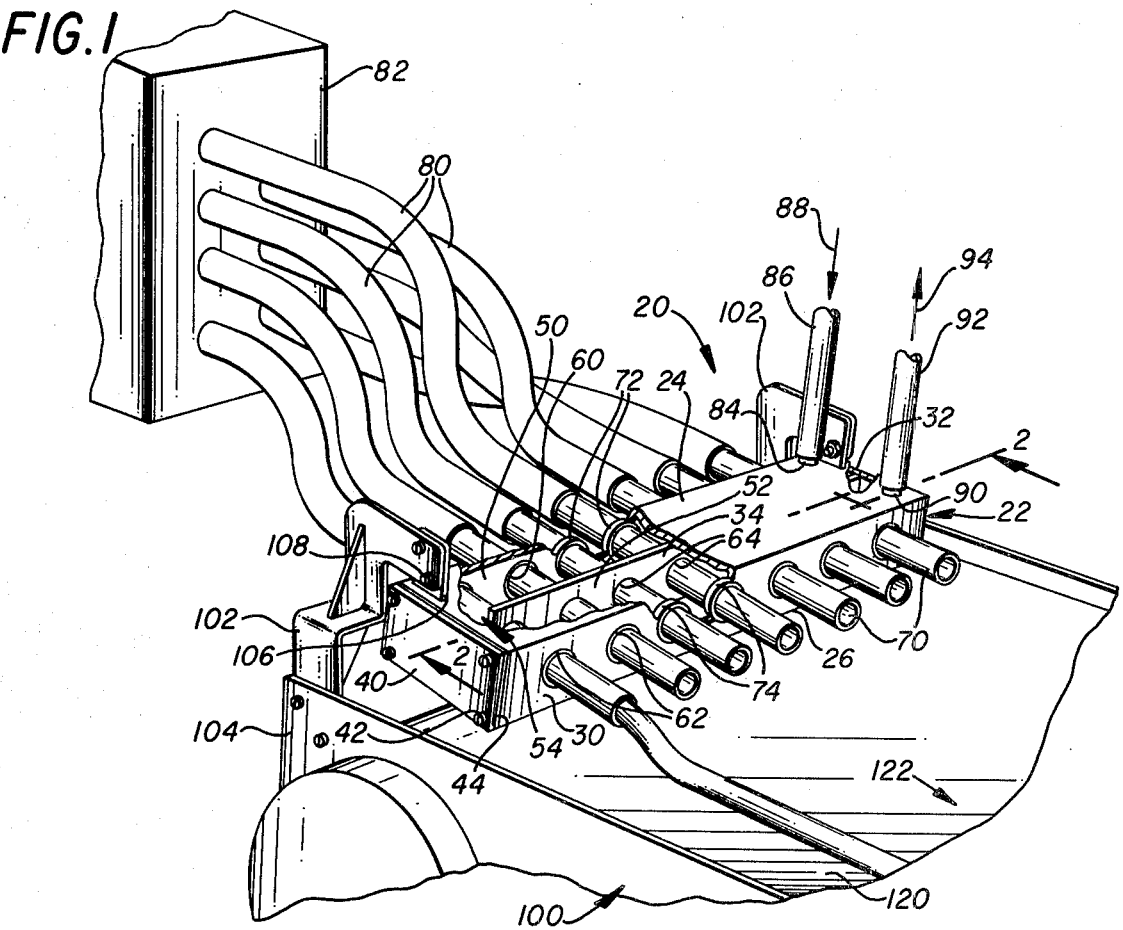
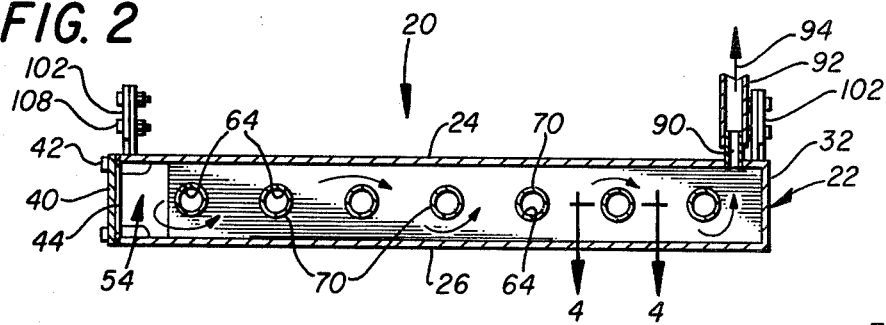
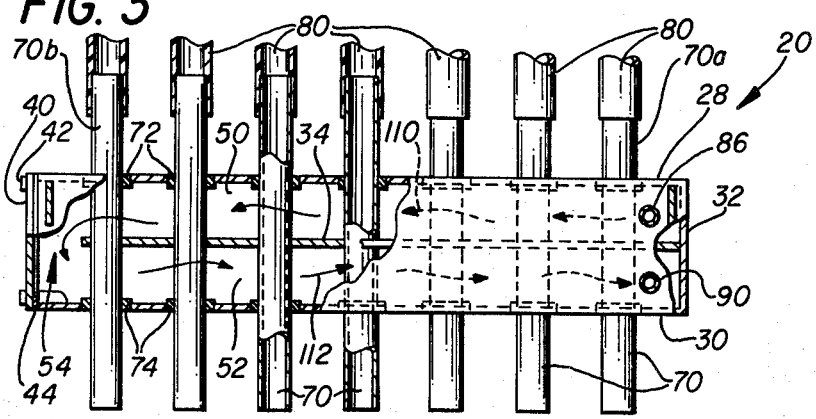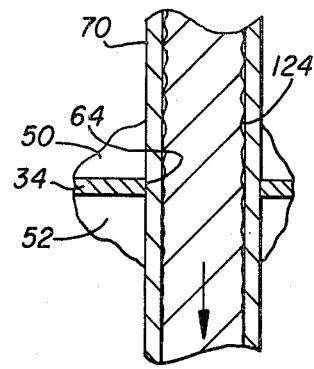

METHOD OF EXTRUDING SEMI-FLUID MATERIAL THROUGH A HEATED EXTRUDER NOZZLE AND HEATED EXTRUDER NOZZLE

BACKGROUND OF THE INVENTION

1. Field of the Invention

The present invention relates to an extruder nozzle for extruding semi-fluid products, and more particularly to a heated extruded nozzle for facilitating the extrusion of such products.

2. Description of the Prior Art

A wide variety of products, such as foods, building materials, explosives and products made from rubber are commonly formed from a semi-fluid material. With respect to food products, it has become desirable, both in the home as well as in restaurants, to utilize food portioned in predetermined serving sizes. For example, it has become desirable to provide serving portions of sausage in sausage links.

In co-pending application Ser. No. 610,301, filed Sept. 4, 1975, now U.S. Pat. No. 4,124,339, an apparatus is provided for producing discrete products from semi-fluid material. In one application of the process disclosed in that application, the still warm pre-rigor pork is boned, ground and blended and then pumped to a plurality of extruder nozzles. The output of the nozzles is carried by way of a moving conveyor through a chilling station where the extruded sausage is cut and packaged into discrete product links.

As can be appreciated from the disclosure in this co-pending application, the extruded sausage is skinless, thereby eliminating the requirement of stuffing comminuted sausage into a casing. While extruding skinless sausage in the manner described in the co-pending application eliminates much of the expense involved in forming sausage with an outer casing, unless the sausage is extruded at precisely controlled temperatures and conditions, resulting friction between the extruder tubes and the comminuted meat causes fat to come to the surface of the sausage, thereby producing a product which appears to consist of all or excessive fat. This result is of course unpleasing to the customer and therefore unacceptable.

A need has thus developed for a system to eliminate the problems heretofore encountered in extruding comminuted meats having any fat content or any semi-fluid products which must be extruded through tubes where the extrusion is made difficult because of friction between the interior walls of the tube and the meat products.

SUMMARY OF THE INVENTION

The present invention reduces or eliminates the problems heretofore encountered in extruding comminuted meat products or other semi-fluid materials through an extruder nozzle by providing heat to the nozzle during extrusion. The heated extruder nozzle of the present invention includes a chamber having an extruder tube extending through the chamber for the delivery of semi-fluid material therethrough. Structure is provided for circulating heated fluid through the chamber and around the extruder tube to impart heat to the tube thereby facilitating the flow of material therethrough.

In accordance with another embodiment of the invention, a plurality of extruder tubes extend through the chamber with the tubes being spaced one from the other. A baffle wall divides the chamber into a first baffle area and a second baffle area with the first and second baffle areas being in fluid communication through an opening in the baffle wall. The extruder tubes are so positioned in the chamber to extend through both the first and second baffle areas.

A delivery inlet receives heated fluid into the first baffle area, and a return outlet discharges heated fluid from the second baffle area. The inlet and outlet communicate with the first and second baffle areas, respectively, on opposite sides of the extruder tubes from the opening in the baffle wall communicating between the first and second baffle areas. As a result of this arrangement, fluid entering through the delivery inlet follows a path past each of the extruder tubes and then into the second baffle area through the opening in the baffle wall and past each of the extruder tubes before being discharged through the return outlet. The fluid temperature is gradually reduced as heat is transferred from the fluid to the extruder tubes and the material being extruded therethrough. The fluid will be at a maximum temperature at the inlet and at a minimum temperature at the outlet. Thus, the temperature of the fluid is continuously decreasing from the inlet to the opening in the baffle wall between the first and second baffle areas and from the baffle wall opening to the return outlet. As a result, material extruded through each tube experiences substantially the same heat transfer from the fluid with the extruder tube adjacent the inlet and outlet being exposed to the fluid at its highest point in the first baffle area and at the fluid's coolest point in the second baffle area. Correspondingly, the extruder tube remote from the inlet and outlet areas and adjacent the opening in the baffle wall is exposed to the fluid at its coolest point in the first baffle area but at its hottest point in the second baffle area.

In accordance with another embodiment of the invention, the first baffle area is substantially equal in volume to the volume of the second baffle area.

In accordance with still another embodiment of the invention, the tubes have a first surface area exposed to the fluid in the first baffle area and a second surface area substantially equal in area to the first surface area exposed to the fluid in the second baffle area. Further, the tubes are equal in wall thickness and in diameter one to the other.

DESCRIPTION OF THE DRAWINGS

For a more complete understanding of the present invention and for further details and advantages thereof, reference is now made to the following description, taken in conjunction with the accompanying drawings, in which:

FIG. 1 is a perspective view, partially broken away, illustrating the heated extruder nozzle of the present invention with a semi-fluid material being extruded through one of the nozzle tubes;

FIG. 2 is a section view taken along lines 2—2 of FIG. 1;

FIG. 3 is a top plan view partially broken away showing the heated extruder nozzle of the present invention; and FIG. 4 is an enlarged section view taken along lines 4—4 of FIG. 2.

DESCRIPTION OF THE PREFERRED EMBODIMENT

FIG. 1 is a perspective view, partially broken away, illustrating the use of the heated extruder nozzle 20 of the present invention for forming fresh pork sausage. It has been found that the present invention is particularly adaptable to making fresh pork sausage and a detailed description of the invention will be made with respect to production of pork sausage. However, it will be apparent that the present invention may also be utilized to facilitate the extrusion of other semi-fluid material. For the purpose of this invention, the term semi-fluid is defined as material which is pumpable through conduits. The present invention may thus be utilized to extrude a plurality of pumpable materials where extrusion is facilitated by adding heat to the extruding process.

The heated extruder nozzle 20 includes a chamber housing 22 having a top and bottom wall 24 and 26, respectively, a rear and forward wall 28 and 30, respectively, and an end wall 32. A baffle wall 34 is formed between upper and lower walls 24 and 26 and extends substantially parallel to rear and forward walls 28 and 30. Baffle wall 34 extends to end wall 32. The end of chamber housing 22 remote from end wall 32 is sealed by an end plate 40 attached to walls 24, 26, 28 and 30 by screws 42. A gasket 44 is positioned between end plates 40 and walls 24, 26, 28 and 30 to provide a fluid type seal therebetween. As can be seen in FIG. 1, baffle wall 34 divides chamber housing 22 into a forward baffle area 50 and a rearward baffle area 52. The baffle wall does not extend to end plate 40 thus providing an opening 54 between forward baffle area 50 and rearward baffle area 52.

Wall 28 is formed with a plurality of apertures 60. Similarly, forward wall 30 is formed with apertures 62, and baffle wall 34 is formed with apertures 64. A plurality of extruder tubes 70 are fitted through apertures 60, 62 and 64 in walls 28, 30 and 34, respectively. Annular gaskets 72 are mounted in apertures 60 to form a fluid tight seal between tubes 70 and wall 28. Similarly, annular gaskets 74 are mounted in apertures 62 of wall 30 to form a fluid tight seal between tubes 70 and wall 30. A close engagement fit is provided between tubes 70 and apertures 64 in wall 32 to form substantially a fluid tight seal therebetween. A plurality of flexible tubes 80 connect extruder tubes 70 to individual metering pumps (not shown) located in housing 82.

An inlet nipple 84 is mounted to upper wall 24 above forward baffle area 50 at one end of the baffle area. A hose 86 is engaged over nipple 84 and delivers fluid into forward baffle area 50 as is indicated by arrow 88. An outlet nipple 90 is mounted to upper wall 24 above rearward baffle area 52 adjacent to one end of housing 22. A hose 92 is mounted over nipple 90 to receive the flow of fluid from baffle area 52 in the direction illustrated by arrow 94.

Heated extruder nozzle 20 is mounted above a conveyor unit 100 by brackets 102 extending upwardly from frame 104 of conveyor unit 100. Brackets 102 are mounted to ears 106 attached from upper wall 24 of housing 22. Attachment of bracket 102 to ears 106 is by way of bolts 108.

Referring now to FIGS. 2 and 3, in a preferred embodiment of the invention, inlet and outlet nipples 84 and 90, respectively, communicate into baffle areas 50 and 52 on the opposite side of tubes 70 from opening 54 communicating between baffle areas 50 and 52. As a result of this arrangement, heated fluid entering inlet nipple 84 into forward baffle area 50 follows a path indicated by arrow 110 (FIG. 3) past each of the plurality of extruder tubes 70 prior to flowing into rearward baffle area 52 through opening 54. Then, the heated fluid again follows a path indicated by arrow 112 (FIG. 3) past each of the extruder tubes 70 prior to being exhausted through outlet nipple 90.

As a result of this arrangement, the heat transfer to each extruder tube is balanced. For example, referring to FIG. 3, the portion of extruder tube 70a within baffle area 50 communicates with the fluid at its highest temperature prior to transfer of heat to the extruder tubes and semi-fluid material passing therethrough. Each successive extruder tube is exposed to fluid slightly lower in temperature. The portion of extruder tube 70b in baffle area 50 is exposed to the heated fluid at its lowest temperature in baffle area 50. The portion of extruder tube 70b within baffle area 52 is exposed to the heated fluid at its highest temperature within baffle area 52 in that the temperature of the heated fluid will continue to decrease as heat is absorbed by the extruder tubes and the material therein as the fluid flows through baffle area 52 to outlet nipple 90. Thus, the portion of extruder tube 70a within baffle area 52 is exposed to the heated fluid at its lowest temperature.

Because the extruder tubes are exposed to the heated fluid at differing temperatures, with extruder tube 70a being exposed to heated fluid at both its highest and lowest temperatures while extruder tube 70b is exposed to the fluid at substantially intermediate temperatures between its hottest and coolest points, the total heat transfer from the heated fluid to the extruder tubes is substantially identical one to the other. This is a result of the temperature gradient of the heated fluid varying substantially linearly from the point of entry through inlet nipple 84 to the point of its exist through outlet nipple 90.

As is shown in FIGS. 1 and 3, the inlet tubes are substantially equally spaced one from the other and are substantially equal in tube thickness and diameter one to the other. Further, the surface area exposed in baffle area 50 and baffle area 52 of each of the tubes is substantially the same. Of course, it will be understood by one skilled in the art that each of these parameters may be varied to more accurately control and vary as desired the heat transfer from the heated fluid to the extruder tubes and the material flowing therethrough.

In a preferred embodiment of the invention, the heated fluid used in the system is either hot water or steam. Other types of heated fluid may be substituted for either of these fluids as desired. Moreover, the speed at which fluid is pumped into and out of the heated extruder nozzle may also be varied as desired, to vary the amount of heat transferred to the extruder tubes and the material flowing therethrough.

In operation of the system of the present invention, a semi-fluid material, such as comminuted pork, is pumped by metering pumps in housing 82 through each of the tubes 80 attached to extruder tubes 70. The food product is extruded through tubes 70 and discharged onto conveyor unit 100 having a conveyor belt 120 moving in the direction of arrow 122. As the food product is extruded from extruder tube 70, it is engaged onto conveyor belt 120 and carried forward for subsequent handling. During extrusion, heated fluid, such as hot water or steam, is injected through hose 86 into the forward baffle area 50 through inlet nipple 84. This fluid completely fills baffle area 50 surrounding extruder tube 70 and follows a path indicated by arrow 110 (FIG. 3) past each of the extruder tubes 70 through opening 54 between baffle areas 50 and 52 and into baffle area 52. The fluid completely fills baffle area 52 surrounding extruder tubes 70 and moves past each of the extruder tubes as indicated by arrow 112 (FIG. 3) to be discharged through outlet nipple 90.

By imparting heat to extruder tubes 70, the sausage or other food products being extruded are glazed and the surfaces adjacent to the interior of tubes 70 are polished and reset. Further, the beading up and surfacing of fat is eliminated. Thus, the appearance of the finished product is substantially improved. Moreover, as is shown in FIG. 4, the surface texture 124 of the extruded product is smoothed and polished, also producing a substantially improved appearance in the finished product. This polishing of the surface of the food product also permits more uniform operation and reduces back pressure in the system.

Thus, the present invention provides a heated extruder nozzle including a chamber divided by a baffle wall into a first baffle area and a second baffle area with the first and second baffle areas being in fluid communication through an opening in the baffle wall. A plurality of extruder tubes extend through the chamber and are spaced one from the other. A delivery inlet receives heated fluid into the first baffle area and a return outlet provides for the discharge of the heated fluid from the second baffle area. The inlet and outlet communicate with the first and second baffle areas, respectively, on opposite sides of the extruder tubes from the opening in the baffle wall such that the heated fluid follows a path past each of the extruder tubes in the first baffle area then into the second baffle area and again past each of the extruder tubes to the discharge outlet. In this way, the heat transfer from the heated fluid to the product passing through each of the exterior tubes is substantially equalized producing a plurality of products having improved surface appearance.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elments without departing from the spirit of the invention. The present invention is therefore intended to encompass such rearrangements, modifications and substitutions of parts and elements as fall within the scope of the appended claims.

What is claimed is:

1. A method of extruding semi-fluid material comprising:
   pumping the semi-fluid material through a plurality of conduits,
   simultaneously circulating a heated fluid through a first chamber surrounding the conduits,
   circulating fluid from the first chamber to a second chamber surrounding the conduits, and
   exhausting fluid from the second chamber.

2. The method of claim 1 further comprising:
   injecting the fluid into the first chamber to one side of the conduits,
   transferring the fluid from the first chamber to the second chamber at a point on the opposite side of the conduits from the point of injection of the fluid into the first chamber, and
   exhausting fluid from the second chamber at a point on opposite sides of the conduits from the point of transfer from the first chamber to the second chamber.

3. A heated extruder nozzle comprising:
   a chamber having a baffle wall therein dividing the chamber into a first and a second baffle area, said first and second baffle areas being in fluid communication by way of an opening therebetween,
   a plurality of extruder tubes extending through the first and second baffle areas for carrying a semi-fluid mixture therethrough,
   inlet means for receiving heated fluid into the first baffle area,
   outlet means for discharging heated fluid from the second baffle area, and
   communication means for communicating fluid from the first baffle area to the second baffle area to permit the flow of fluid from the inlet means to be discharged through the outlet means.

4. The extruder nozzle of claim 3 wherein said inlet means and said outlet means communicate with the first and second baffle areas, respectively, on opposite sides of said extruder tubes from the communication means between the first and second baffle areas.

5. The extruder nozzle of claim 4 wherein said first baffle area is substantially equal in volume to the volume of said second baffle area.

6. The extruder nozzle according to claim 4 wherein said tubes have a first surface area exposed to fluid in the first baffle area and a second surface area substantially equal in area to the first surface area exposed to fluid in the second baffle area.

7. The extruder nozzle according to claim 4 wherein said tubes are equal in wall thickness and diameter one to the other.

8. A heated extruder nozzle for extruding a plurality of strands of comminuted meat products with a polished and smooth surface texture, comprising:
   a chamber,
   a baffle wall dividing said chamber into a first baffle area and a second baffle area, the first and second baffle areas being in fluid communication through an opening in the baffle wall,
   a plurality of extruder tubes each extending through the first baffle area and the second baffle area of said chamber,
   a delivery inlet for receiving heated fluid into the first baffle area, and
   a return oulet for discharging heated fluid from the second baffle area, said inlet and outlet communicating with the first and second baffle areas, respectively, at points remote from the opening in the baffle wall.

9. The extruder nozzle of claim 8 wherein said first baffle area has a generally rectangular cross section with said inlet communicating with one end and the opening in the baffle wall adjacent the opposite end, and wherein said second baffle area has a generally rectangular cross section with the outlet communicating with one end and the opening in the baffle wall adjacent the opposite end.

10. The extruder nozzle of claim 9 wherein said first baffle area is substantially equal in volume to the volume of said second baffle area.

11. The extruder nozzle of claim 9 wherein said tubes have a first surface area exposed to fluid in said first baffle area and a second surface area substantially equal in area to the first surface area exposed to the fluid in the second baffle area.

12. The extruder nozzle of claim 9 wherein said heated fluid is water.

13. The extruder nozzle of claim 9 wherein said heated fluid is steam.

14. The extruder nozzle of claim 9 wherein the material extruded through said extruder tube comprises pre-rigor comminuted pork sausage.

15. The extruder nozzle of claim 9 wherein said tubes are equal in wall thickness and diameter one to the other.

* * * * *

UNITED STATES PATENT AND TRADEMARK OFFICE
CERTIFICATE OF CORRECTION

PATENT NO. : 4,207,281
DATED : June 10, 1980
INVENTOR(S) : Vincent E. Bernard

It is certified that error appears in the above-identified patent and that said Letters Patent are hereby corrected as shown below:

Column 4, line 52, after "may" insert --readily--;
Column 5, line 40, change "exterior" to --extruder--.

Signed and Sealed this

Thirtieth Day of September 198

[SEAL]

Attest:

SIDNEY A. DIAMOND

*Attesting Officer*  *Commissioner of Patents and Trademar*